(12) United States Patent
Zebchuk et al.

(10) Patent No.: US 11,010,318 B2
(45) Date of Patent: May 18, 2021

(54) METHOD AND APPARATUS FOR EFFICIENT AND FLEXIBLE DIRECT MEMORY ACCESS

(71) Applicant: Cavium, LLC, Santa Clara, CA (US)

(72) Inventors: Jason Daniel Zebchuk, Watertown, MA (US); Gregg Alan Bouchard, Georgetown, TX (US); Tejas Maheshbhai Bhatt, Sunnyvale, CA (US); Hong Jik Kim, Los Gatos, CA (US); Ahmed Shahid, San Jose, CA (US)

(73) Assignee: CAVIUM INTERNATIONAL, Grand Cayman (KY)

( * ) Notice: Subject to any disclaimer, the term of this patent is extended or adjusted under 35 U.S.C. 154(b) by 457 days.

(21) Appl. No.: 15/154,994

(22) Filed: May 14, 2016

(65) Prior Publication Data

US 2017/0329731 A1    Nov. 16, 2017

(51) Int. Cl.
   *G06F 13/36*   (2006.01)
   *G06F 13/28*   (2006.01)
   *G06F 5/06*    (2006.01)

(52) U.S. Cl.
   CPC .............. *G06F 13/28* (2013.01); *G06F 5/065* (2013.01); *G06F 2205/067* (2013.01)

(58) Field of Classification Search
   None
   See application file for complete search history.

(56) References Cited

U.S. PATENT DOCUMENTS

| | | | | | |
|---|---|---|---|---|---|
| 5,307,459 | A | * | 4/1994 | Petersen | H04L 29/06 709/234 |
| 5,420,984 | A | * | 5/1995 | Good | G06F 13/287 709/212 |
| 5,978,844 | A | * | 11/1999 | Tsuchiya | G06F 9/5083 709/221 |
| 2004/0015621 | A1 | * | 1/2004 | Tanaka | G06F 13/28 710/22 |
| 2006/0010264 | A1 | * | 1/2006 | Rader | B65H 35/0013 710/23 |

* cited by examiner

*Primary Examiner* — Henry Tsai
*Assistant Examiner* — Dean Phan
(74) *Attorney, Agent, or Firm* — pkalousk.ip (57) ABSTRACT

Method and system embodying the method for a direct memory access between a data storage and a data processing device via one or more direct memory access units, comprising transferring data between the data storage and a first direct memory access engine of a respective one or more direct memory access units and providing the data for a second direct memory access engine of the respective one or more direct memory access units; and transferring the data provided by the first direct memory access engine by a second direct memory access engine to the data processing device via the second direct memory access engine is disclosed.

16 Claims, 5 Drawing Sheets

METHOD AND APPARATUS FOR EFFICIENT AND FLEXIBLE DIRECT MEMORY ACCESS

BACKGROUND

1. Field

The present disclosure relates to shared direct memory access (DMA). More particularly, this invention is directed toward a direct memory access unit for efficient and flexible transfer of job related data in digital signal processing.

2. Description of Related Technology

In computer systems, direct memory access is a feature of data computer systems that allows hardware subsystems to access main system memory independently of a central processing unit (CPU). In this context, the central processing unit comprises an entity, e.g., a general purpose processor, responsible for data transfer when DMA is not involved. Thus DMA enables more efficient use of resources and increases data throughput, which in turn may reduce power requirements and/or enable more application work to be done.

Figure 1:
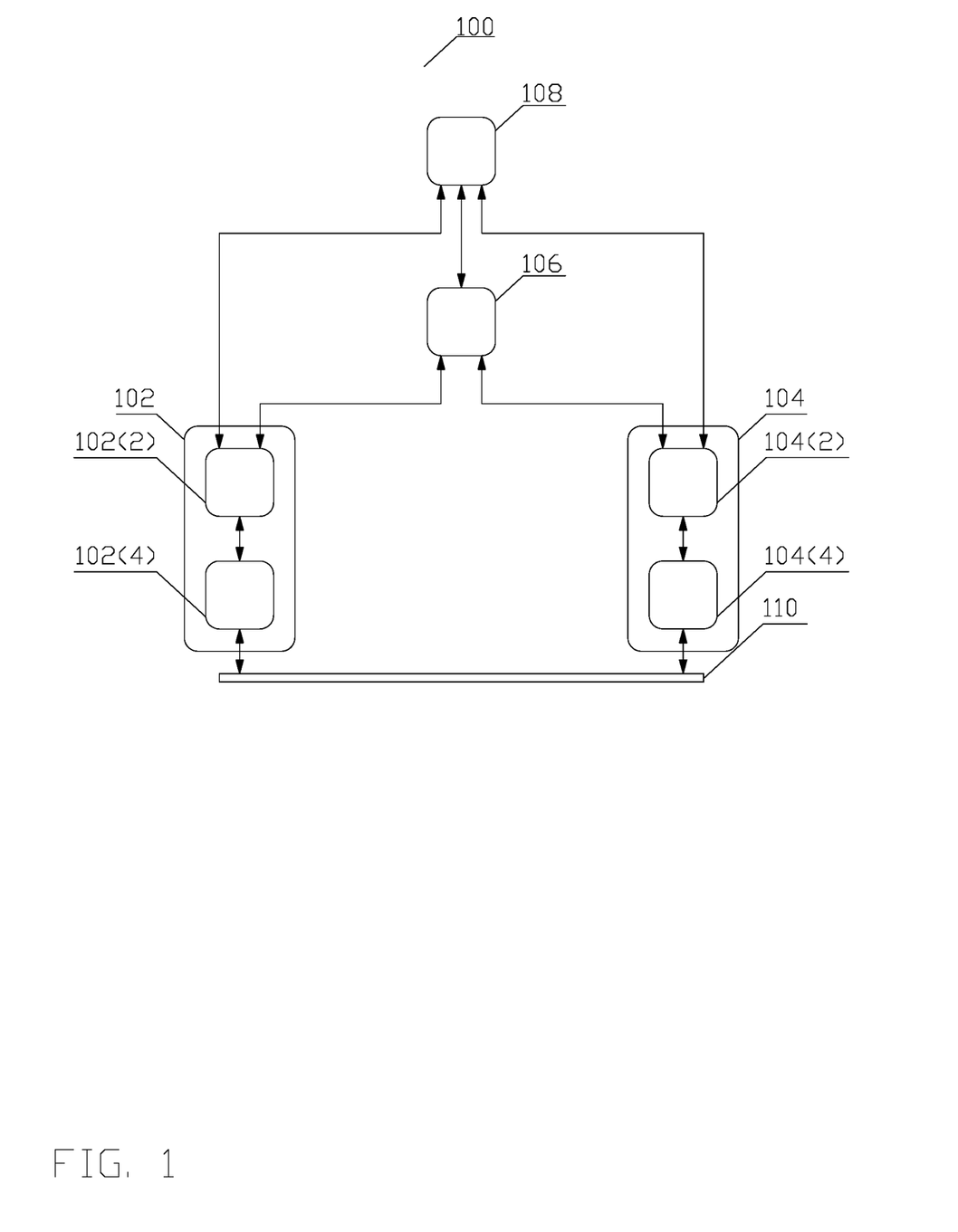
FIG. 1 depicts a conceptual structure 100 of a typical direct memory access in accordance with known aspects.

FIG. 1 depicts a conceptual structure 100 of a typical DMA in accordance with known aspects. Upon requiring data transfer to or from a main memory 102, a hardware subsystem 104 notifies a DMA controller 106. Although the DMA controller 106 is depicted a separate device, the DMA controller 106 may also be implemented at the hardware subsystem 104. In response to the notification, the DMA controller 106, asserts a DMA requests to a central processing unit 108 for permission to initiate the data transfer. The CPU completes or interrupts current activity, including any communicative coupling common to the main memory 102 and the hardware subsystem 104, and returns a DMA acknowledgement to the DMA controller 106, optionally with parameters for the DMA transfer. Upon receiving the acknowledgement, the DMA controller 106, initiates internal circuitry necessary to control the data transfer, establishes a communicative coupling 110 between the main memory 102 and the hardware subsystem 104, and starts the data transfer. Upon concluding the data transfer, the DMA controller 106 releases the communicative coupling 110 and de-asserts the DMA request. The CPU 108 may then remove the DMA acknowledge and may resume control of any communicative coupling common to the main memory 102 and the hardware subsystem 104.

Although most of the management of the DMA transfer is carried out by the DMA controller 106, both the main memory 104 and the hardware subsystem 104 inherently contribute. By means of an example for transfer from the main memory 102, a memory management unit 102(2) assists in establishing the communicative coupling 110, manages accessing the data in the main memory storage space 102(4) and providing the data to the communicative coupling 110. A controller 104(2) at the hardware subsystem 104 manages assists in establishing the communicative coupling 110, manages accessing reading the data from the communicative coupling 110 and writing the data to a proper location of a local memory 104(4).

Since the memory management unit 102(2) is specifically designed for management of data access and movement, the associated overhead may not be significant. Similarly, should the subsystem device 104 comprise, e.g., a hard drive, the hard drive controller 104(2) is again specifically designed for management of data access and movement. However, the DMA transfer, even in such a data transfer optimized solution, imposes significant limitations. As disclosed supra, a single entity, i.e., the DMA controller 106 after optionally receiving parameters for the DMA transfer from the CPU 108, controls the transfer. The DMA transfer controlling entity decides on allocation of the sink device's, i.e., the hardware subsystem's 104, local memory. However, the sink device itself is responsible for managing the sink device's local memory. Because there is no communication regarding sink device's local memory allocation between the DMA transfer controlling entity and the sink device's local memory, the memory allocation by the DMA transfer controlling entity to be obeyed by the sink device imposes restriction on the memory management by the sink device.

In addition to the above noted limitations, consider a subsystem device 104 specialized for a task different from managing data storage, e.g., data processing. Such a data processing subsystem device 104 may comprise, e.g., a digital signal processor. A digital signal processor (DSP) comprises a processor or multi-processor unit, the architecture and instruction set of which is optimized for the operational needs of numerical manipulation of signal represented by digital data. Not only is the architecture and the instruction set not necessarily optimized for management of access and movement of data, but any overhead the DSP must spend on such management prevents the DSP from the numerical manipulation of the data.

Accordingly, there is a need in the art for a method and an apparatus implementing the method for direct memory access unit for efficient and flexible transfer of job related data in digital signal processing, as well as additional advantages.

SUMMARY

In an aspect of the disclosure, an apparatus implementing a method for a direct memory access between a data storage and a data processing device via one or more direct memory access units according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 2A:
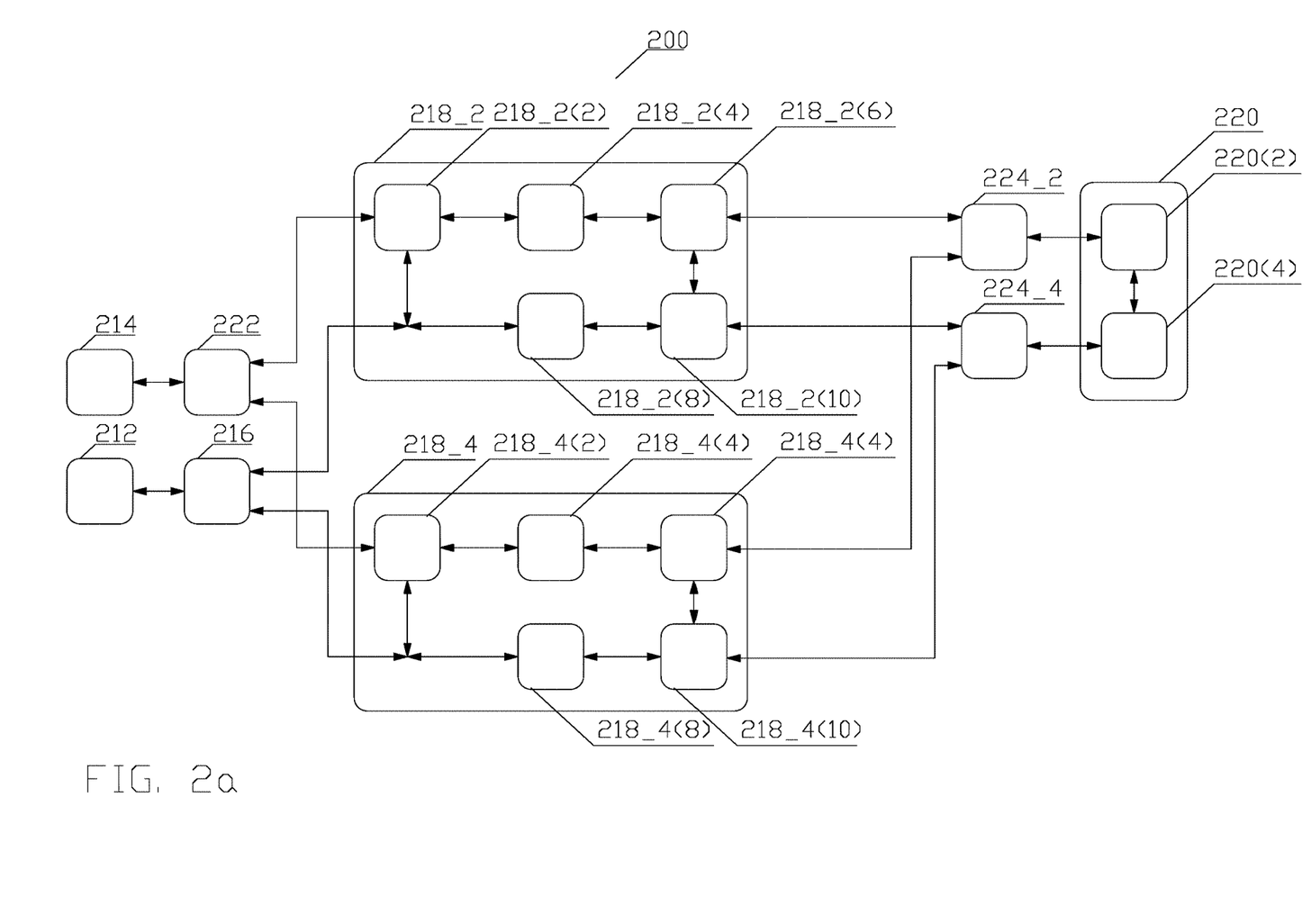
FIG. 2a depicts a conceptual structure 200 for efficient and flexible transfer of job description and job related data in digital signal processing via a direct memory access unit in accordance with aspects of this disclosure.

The description of like structural elements among the figures, is not repeated, the like elements have reference numerals differing by an integer multiple of 100, i.e., reference numeral 102 in FIG. 1, becomes reference numeral 202 in FIG. 2; unless differences and/or alternative aspects are explicitly noted. In the drawings, an expression "_X" in a reference indicates an instance of an element, while and expression "(X)" indicates a sub-block in a drawing where helpful for better understanding. Any unreferenced single and/or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "communicatively coupled" is intended to specify a communication path permitting information exchange either directly among the communicatively coupled entities, or via an intervening entity.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 2a depicts a conceptual structure 200 for efficient and flexible transfer of job description and job related data via a direct memory access (DMA) unit in accordance with aspects of this disclosure. A job scheduler 212 selects a job from a plurality of jobs to be accomplished and provides the job description to a job manager 216. A job describes a specific task to be performed by a data processing device. Such a data processing device may comprise any hardware or a software entity executing on an underlying hardware, carrying out processing utilizing the data storage, e.g., a graphics processing unit (GPU), a digital signal processor, or any other device known to one of ordinary skill in the art. Although a digital signal processor (DSP) 220 is used as an example of the data processing device, such is for explanation of the concepts only, and any data processing device is contemplated. In one aspect, the job includes an initial memory address in the system memory 214 where the entire job description resides. In other aspect, the job comprises the entire job description, thus no access to the system memory 214 is required. In either case, the entire job description might comprise a job identifier, a list of DMA commands describing the input data for the job, a list of DMA commands describing the output data to be produced by the job, and/or any other information relevant to the job.

Job manager 216 may comprise a firmware controlled hardware entity, a pure hardware entity, i.e., an entity not requiring any firmware, or a software entity executing on a processor. As well known to a person of ordinary skill in the art, firmware is a type of software that provides control, monitoring and data manipulation of a hardware entity that executes the firmware. The firmware is not meant to be changed, the reasons for changing firmware include fixing bugs or adding features to the hardware entity. A job manager 216 may manage jobs for a plurality of programmable DMA units 218_X. In such a case, the job description comprises separate commands for each of the plurality of programmable DMA units 218_X, and the job manager 216 provides each of commands to the corresponding DMA unit 218_X. The job manager 216 can support multiple outstanding jobs, wherein the commands from each job are programmed into the each of the plurality of programmable DMA units 218_X in order.

A programmable DMA unit 218_X may comprise a pure hardware entity that is programmed by the list of DMA commands in the job descriptor and/or register 218_X(10). A register comprises a small amount of storage that is (typically) addressed by mechanisms other than main memory and can thus be accessed more quickly. The register storage may be subdivided into fields. Alternatively, the programmable DMA unit 218_X may comprise firmware controlled hardware entity or a software entity executing on a processor. Although only two programmable DMA units 218_X are depicted, such is only for the purposes of an explanation, and any number of programmable DMA units 218_X is contemplated. The job manager 216 parses the job description and provides the list of DMA related command(s) in sequential order to one of the external programmable DMA engines 218_X(2) of the programmable DMA units 218_X. Although the programmable DMA engine 218_2(2) is used as an example of one of the external programmable DMA engines 218_X(2), such is for explanation of the concept only, as the functionality of the programmable DMA engines 218_X(X) is the same. In one aspect, each list of DMA command(s) is associated with a specific programmable DMA engine 218_X(X). A DMA command describes a manner of accessing the system memory 214. Thus, a DMA command may specify an initial address and a length to indicate a single continuous blocks of data, or the DMA command may include additional details that describe a more complex access. By means of an example, the DMA command may describe access to a series of continuous blocks of data, separated by a constant offset, or other access patterns known to a person of ordinary skill in the art.

The external programmable DMA engine 218_2(2) accepts the DMA command and issues a load request via a multiplexer/demultiplexer 222 to the system memory 214 in accordance with the DMA command. The system memory 214 returns the requested data via the multiplexer/demultiplexer 222 to the requesting external programmable DMA engine 218_2(2), which provides the received data into a data first in, first out (FIFO) buffer 218_2(4). When the received data is transferred to the data FIFO buffer 218_2(4), the data FIFO buffer 218_2(4) signals to the external programmable DMA engine 218_2(2) whether the data FIFO buffer 218_2(4) is full or has space available. If the data FIFO buffer 218_2(4) is able to accept more data, the external programmable DMA engine 218_2(2) issues a load requests to the system memory 214 in accordance with the DMA command; otherwise, the external programmable DMA engine 218_2(2) pauses load request until data FIFO buffer 218_2(4) is able to accept more data. The process continues, until all DMA commands from the list have been exhausted. The external programmable DMA engine 218_2 (2) notifies the job manager 216 that requests the job scheduler 212 for selecting another job from the plurality of jobs to be accomplished.

At substantially the same time of providing the DMA related commands to the external programmable DMA engine 218_2(2), the job manager 216 also provides other job related information, which is a part of the job description, into a job first in, first out (FIFO) buffer 218_2(8), which transfers the job related information to the register structure 218_2(10), comprising a plurality of registers. The FIFO buffers 218_2(4), 218_2(8) thus enable the job manager 216 to carry out job processing, i.e., enabling the external programmable DMA engine 218_2(2) to process DMA related commands and providing the associated job related information to the register structure 218_2(10) while the internal programmable DMA engine 218_2(6) is still processing the preceding DMA related commands in accordance with the associated job related information. Consequently, the job manager 216 can push details on the next upcoming job including providing associated DMA related commands, while the register structure 218_2(10) is still reporting details from the previous job and the internal programmable DMA engine 218_2(6) is processing the associated DMA related commands. A conceptual structure of the register structure 218_2(10) is provided in FIG. 2a.

Figure 2B:
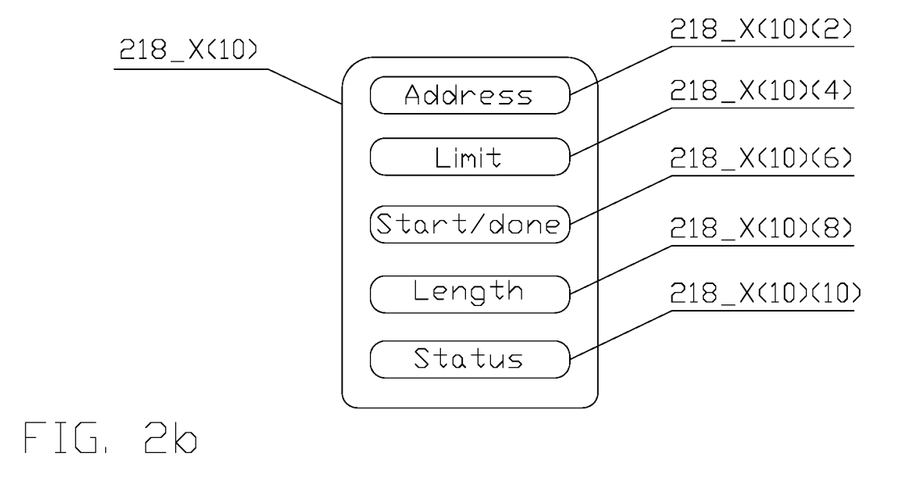
FIG. 2b depicts a conceptual structure of a programmable direct memory access unit register in accordance with aspects of this disclosure.

Referring to FIG. 2b, the register structure 218_X(10) comprises plurality of fields including but not being limited to, e.g., an address register 218_X(10)(2) identifying an initial address of the local memory 220(4) of FIG. 2a where the data is to be written, a limit register 218_X(10)(4) comprising a field indicating the amount of space available for the DMA transfer in the local memory 220(4) of FIG. 2a and, optionally a "last" bit field indicating whether overflow/underflow condition should be evaluated for the DMA transfer, a start/done register 218_X(10)(6) indicating whether a DMA transfer is active, a length register 218_X (10)(8) indicating the amount of data written to the local memory 220(4) of FIG. 2, and a status register 218_X(10) (10), comprising a plurality of fields, a conceptual structure of which is depicted in FIG. 2b. A DMA transfer is active, when the DSP 220 has finished programming the internal programmable DMA engine 218_2(6) to process a job and sets the start/done register 218_X(10)(6).

Referring to FIG. 2b, the status register 218_X(10)(10) comprises a plurality of fields including but not being limited to, e.g., a field PENDING 218_X(10)(10)(2), indicating that a DMA transfer is pending; a field LAST_DONE 218_X(10)(10)(4), indicating that the last DMA transfer concluded all the DMA transfers for a specific job; a field ERROR 218_X(10)(10)(6), indicating whether or not there was an error in the last DMA transfer, a field UNDERFLOW 218_X(10)(10)(8), indicating whether an underflow has occurred during the DMA transfer; a field OVERFLOW 218_X(10)(10)(10), indicating whether an overflow has occurred during the DMA transfer; a field JOB_SLOT 218_X(10)(10)(12), indicating with which job the last DMA transfer was associated, and a field PENDING SLOT 218_X (10)(10)(14), indicating with which job the pending DMA transfer is associated. A DMA transfer is pending when the external programmable DMA engine 218_2(2) is processing a job, but the start/done register has not been set yet.

Returning now to FIG. 2a, to notify the DSP 220 that a new job is awaiting processing, in one aspect, the job manager 216 sets the PENDING field 218_X(10)(10)(2) and issues an interrupt. The interrupt is provided via the programmable DMA unit 218_2 and the multiplexers/demultiplexers 224_X to the DSP 220. Since the multiplexers/demultiplexers 224_X communicatively couple the DSP 220 to each of the programmable DMA units 218_X, the DSP core may program each internal programmable DMA engine 218_X(6) independently. Consequently, as noted supra, using the programmable DMA unit 218_2 is merely an example for explanation of the concept only.

In response to the interrupt, a DSP core 220(2) may issue read requests to the PENDING field 218_X(10)(10)(2) to confirm that the external programmable DMA engine 218_X (2) has pending data for a job. In another aspect, the DSP core 220 may issue the read requests to the PENDING field 218_X(10)(10)(2) in accordance with a schedule. The schedule may comprise a continuous schedule, a periodic schedule, or any other schedule known to a person of ordinary skill in the art. Upon confirmation by reading the PENDING field 218_X(10)(8)(2) that DMA is pending and data is available in the data FIFO buffer 218_2(4), and the information related to the job indicates that the job is a regular job, the DSP core 220 generates instructions to program the internal programmable DMA engine 218_2(6) to transfer the data from the data FIFO 218_2(4) into the DSP local memory 220(2). A regular job is any job other than a preset-address job disclosed infra.

Programming the internal programmable DMA engine 218_2(6) comprises writing the start address of the local memory 220(4) where the data is to be written into the address register 218_X(10)(2), writing the amount of local memory 220(4) space available for the DMA transfer into the limit register 218_X(10)(4), and writing to the start/done register 218_X(10)(6) to initiate the transfer.

In response to the programmed information, the internal programmable DMA engine 218_2(6) issues store request(s) to transfer the data from the data FIFO 218_2(4) into the DSP local memory 220_4(2). As the data are being transferred from the data FIFO 218_2(4), and not all the DMA commands have been exhausted, the external programmable DMA engines 218_2(2) issues another load request as disclosed supra. Thus, although the external programmable DMA engines 218_2(2) and the internal programmable DMA engine 218_2(6) are operating independently, the operation is coordinated through the data FIFO 218_2(4) and the job FIFO buffer 218_2(8).

Since after programming the internal programmable DMA engine 218_2(6), the data transfer is handled by the programmable DMA engines 218_2(2) and 218_2(6), the DSP core 220 is freed to perform data processing. This manner of data transfer enables the DMA engine 218_X to perform job pipelining, i.e., the internal programmable DMA engine 218_2(6) can perform data processing for a currently pending job while the external programmable DMA engine 218_2(2) is performing a DMA transfer of data for a subsequent job.

After the DMA transfer between the system memory 214 and the DSP 220 completes, the external programmable DMA engine 218_2(2) communicates through the data FIFO 218_2(4) information related to the completed job. The information may comprise, e.g., the end of the DMA transfer for the job, events that occurred during the DMA transfer, e.g., address translation error, parity/ECC error, access permission error, underflow error, overflow error, and other events, e.g., accessed memory attached to a remote chip, accessed data from an on-chip cache, and other events known to a person of ordinary skill in the art The internal programmable DMA engine 218_2(6) receives the information and reports the information into the status register 218_X(10)(10), e.g., fields 218_X(10)(10)(6), 218_X(10)(10)(8), and 218_X(10)(10)(10).

In one aspect, the internal programmable DMA engine 218_2(6) notifies the DSP 220 about the completed DMA transfer by clearing the start/done register 218_X(10)(6), recording the final length of the transfer in the length register 218_X(10)(8), and issuing an interrupt. Upon receiving the interrupt, the DSP core 220 can read the start/done register 218_X(10)(6). In other aspect, the DSP 220 may poll the register 218_X(10)(6) according to a schedule. The schedule may comprise completion of currently processed job, a periodic schedule, or any other schedule known to a person of ordinary skill in the art. When the DSP core 220 confirms DMA transfer completion by reading the start/done register 218_X(10)(6) the DSP core 220 further reads the length register 218_X(10)(8), and the fields 218_X(10)(10)(6), 218_X(10)(10)(8), and 218_X(10)(10)(10) indicating whether an error, an underflow or an overflow has occurred. The DSP core 220(2) may use the information to ascertain whether the DMA transfer completed with or without errors. When the DMA transfer completed with errors, the DSP core 220(2) may determine that certain errors are non-critical, e.g., errors due to noisy data, errors correctable by additional processing, and other non-critical errors known to a person of ordinary skill in the art. Alternatively, the DSP core 220(2) may determine that the errors are critical errors and, consequently, terminates the job without processing the transferred data.

In the DMA transfer process as disclosed supra, the DSP core 220(2) programmed the internal programmable DMA engine 218_2(6) to transfer all the data for the job in a single DMA transfer. Only when all the data is received, the DSP 220 can begin processing the job.

In one aspect, the job description may contain implicit or explicit instructions for the DSP core 220(2) to program the internal programmable DMA engine 218_2(6) to transfer all the data for the job in a multiple DMA transfer. In response, the DSP core 220(2) programs the internal programmable DMA engine 218_2(6), instructing the address register 218_(10)(2) and the limit register 218_(10)(4) to receive a portion of the data in accordance with the implicit or explicit instructions.

In another aspect, the DSP 220 may want to separate the entire DMA data transfer for a specific job into a multiple transfers of portions of the data, regardless of the job instruction to the external programmable DMA engine 218_2(2) to provide the data continuously. Accordingly, the DSP core 220(2) autonomously generates instructions to programs the internal programmable DMA engine 218_2(6), instructing the address register 218_(10)(2) and the limit register 218_(10)(4) to receive a portion of the data.

When each DMA transfer for the portion of the data completes, the DSP core 220(2) re-programs the internal programmable DMA engine 218_2(6) to receive a next portion of the data. When the DSP core 220_(2) programs the internal programmable DMA engine 218_2(6) to receive the last portion of the data, the DSP core 220(2) sets a "last" bit in the limit register 218_(10)(4), which allows the internal programmable DMA engine 218_2(6) to properly detect underflow/overflow errors. An underflow error occurs when the portion of data from the data FIFO 218_2(4) marked as last is received before the end of the DMA transfer as determined from a size of data to be transferred as programmed in the limit register 218_(10)(4) and the size of data actually transferred as determined from the length register 218_(10)(8). An overflow error occurs when the end of the DMA transfer as determined from the size of data to be transferred is reached without receiving the portion of data from the data FIFO 218_2(4) marked as last. However, in case that each DMA data transfer to the internal programmable DMA engine 218_2(6) is only a portion of the entire DMA data transfer, then the internal programmable DMA engine 218_2(6) cannot properly detect the underflow/overflow conditions unless the internal programmable DMA engine 218_2(6) knows when the last portion of the data is supposed to be transferred. Therefore, if the internal programmable DMA engine 218_2(6) completes the DMA transfer but has not received the portion of the data from the data FIFO 218_2(4) marked as last, the internal programmable DMA engine 218_2(6) will not designate the data as an overflow error unless the DSP 220 had set the "last" bit in the limit register 218_(10)(4) to indicate that the DSP 220 intends the data to be the last DMA transfer for the current job. When the "last" bit in the limit register 218_(10)(4) is not set, the DSP 220 intends to perform multiple DMA transfers, and no overflow errors will be reported.

Figure 2C:
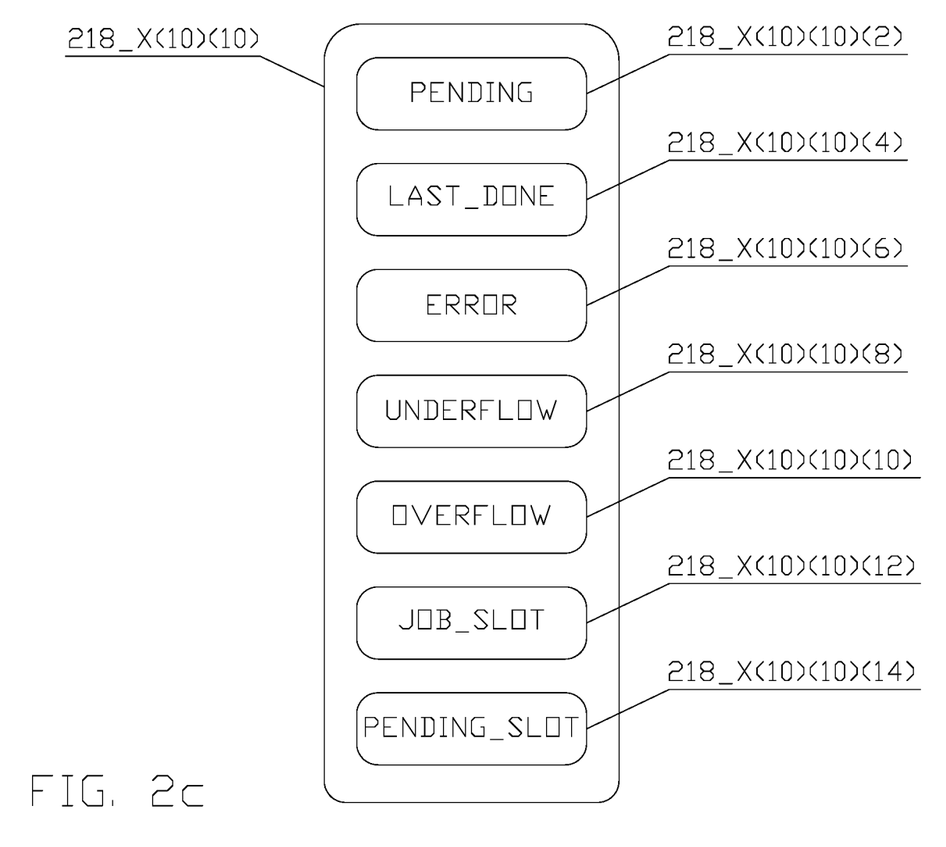
FIG. 2c. depicts a conceptual structure of a status register of the programmable direct memory access unit register in accordance with aspects of this disclosure.

In this aspect, the LAST_DONE field 218_X(10)(8)(4) in the status register 218_X(10)(8) indicates when the portion of data transferred has exhausted all the multiple DMA transfers for the specific job and, consequently, the next DMA transfer will be for a subsequent job. Since the DMA transfer has completed, the start/done field 218_X(10)(6) indicating pending or completion of a DMA transfer is set to done.

The multiple DMA transfers may be beneficial in case that the job is amenable to be processed on partial data, so that the DSP 220 can begin processing data for a job without waiting for the entire DMA transfer to complete. This allows fine-grain job pipelining within a single job. However, as alluded to supra, each time the internal programmable DMA engine 218_2(6) needs to be programmed the time processing efficiency is reduced.

The multiple DMA transfers also allows the DSP 220 to process jobs that have input data larger than the capacity of the local memory 220(4). As each portion of the multiple DMA transfer completes, the DSP core 220(2) can process the data transferred to the local memory 220(4), and then re-program internal programmable DMA engine 218_2(6) to reuse a portion of the local memory's 220(4) location(s) that contains input data that is no longer needed and can thus be overwritten by a subsequent portion of the transferred data. This allows a single job to process a very large input data without the need to break-up the input data across multiple different jobs.

The multiple DMA transfer also allows the DSP 220 to write the DMA transferred data to multiple different locations in the local memory 220(4), i.e., to write the data in a pattern that cannot be supported by programming the internal programmable DMA engine 218_2(6) just once.

Referring again to the DMA transfer process as disclosed supra, the DSP core 220(2) programmed the internal programmable DMA engine 218_2(6) to receive all the data for the job in a single DMA transfer upon receiving a notification of upcoming job. However, in another aspect, the DSP core 220(2) may pre-program the internal programmable DMA engine 218_2(6) before notification of the upcoming job and the information related to the job has been received and, therefore, before an DMA transfer for the upcoming job starts. The DSP core 220(2) pre-programs the internal programmable DMA engine 218_2(6) by means of DSP core 220(2) autonomously generated instructions, instructing the address register 218_(10)(2) and the limit register 218(10) (4) and writes a "start" indicator to the start/done register 218(10)(6). Since the DSP core 220(2) generates the instructions autonomously before receiving job related information, the instructions are independent of the provided job related information. The indicator may comprise a single bit a pre-determined logical value of which indicates to start the transfer. Once the upcoming job is selected by the job scheduler 212 and the job description is provided to the job manager 216, which causes the external programmable DMA engine 218_2(2) to start transferring the job data from system memory 214 to the data FIFO 218_2(4), the internal programmable DMA engine 218_2(6) can immediately start transferring the data from the data FIFO 218_2(4) into the local memory 220_(4) without waiting for any intervention from the DSP core 220(2). This reduces the latency between the time the job is started and the time the DMA transfer begins.

In one aspect, the job description may be configured to always use the same size of DMA transfer, so that the value of the limit register 218_X(10)(4) can always be pre-programmed in advance. Since the amount of the local memory 220(2) to be used is set by the value of the limit register 218_X(10)(4), the DSP core 220(2) may find address that enables an efficient allocation of the local memory 220(2), and write the address into the address register 218_X(10)(2).

In another aspect, the DSP 220 always programs a fixed size value into the limit register 218_X(10)(4) and clears the "last" bit in the limit register 218_X(10)(4), indicating that this is the first of multiple DMA transfers. If the actual DMA transfer described by the job description is smaller than or equal to the fixed size, the result of the DMA transfer will be reported as an underflow, but if the transfer completes with no errors, there is no reason for the DSP 220 to reject the job processing. If, on the another hand, the actual DMA transfer described by the job description is larger than the fixed size, the result of the DMA transfer will not be reported as an overflow or an error because the "last" bit was set in the limit register 218_X(10)(4), and the DSP 220 may re-program the internal programmable DMA engine 218_2 (6) to request additional DMA transfers for the remaining data that was over the fixed size. Once the first DMA transfer is finished, the commands from the job description, or information embedded in the transferred data may instruct the DSP 220 to either continue with the fixed size data DMA transfers or change the value of the limit register 218_X(10) (4).

The programmable DMA units' 218_X structure may also accept special preset-address jobs. A preset-address job description indicates that a job is a preset-address job and comprises for each DMA command a preset-address for the local memory 220(4) and size of data to be transferred. The size of the data is either implicitly or explicitly included in the DMA command. Consequently, the size of the data may either be computed from the implicit information or extracted from the explicit information in the DMA command. When processing such a job, the internal programmable DMA engine 218_X(6) is programmed by writing the preset-address from the DMA command provided in the job related information via the job FIFO 218_X(8) into the address register 218_X(10)(2) and the size of the data into the limit register 218_X(10)(4) without any involvement by the DSP 220. Since the job related information indicates that the job is a preset-address job, the internal programmable DMA engine 218_X(6) accesses the address register 218_X (10)(2) and limit register 218_X(10)(4) automatically, without any intervention from the DSP core 220(2). Because, as disclosed supra, once the internal programmable DMA engine 218_2(6) is programmed the DMA transfer may proceed, the preset-address job requires no involvement of the DSP 220 at all.

In one aspect, the preset-address job may be used for initialization of the DSP 220. The DSP core 220(2) executes instructions that are stored in the local memory 220(4). However, when the DSP 220 is first turned on, the local memory 220(4) is uninitialized and some mechanism is needed to write the program instructions into the local memory 220(4). As disclosed supra, a preset-address job can perform a DMA transfer when the DSP 220 is not initialized, i.e., no software is executing on the DSP core 220_(2) to program the internal programmable DMA engine 218_X(6). Upon the local memory 220(4) initialization, the DSP 220 may be instructed from which address of the local memory 220(4) to start reading instructions upon initialization by any means known to a person of ordinary skill in the art, e.g., using a reset vector.

Similarly, a preset-address job might optionally perform a reset of the DSP core 220(2) to allow it to automatically start executing the newly loaded program after the preset-address job finishes its DMA transfer.

In another aspect, the preset-address job may be used for support of transparent overlays. As known to a person of ordinary skill in the art, an overlay is a technique, wherein different sets of instructions can be loaded into the same location in memory at different points in time. For a transparent overlay, the DSP 220 might be programmed to start each job execution at a specific address, i.e., the preset-address in the local memory 220(4), without specifying exactly what instructions are at the specific address. Preset-address jobs might then be used to load different sets of instructions at the specific address in the local memory 220(4) without requiring any special intervention from the DSP core 220(2).

The structure depicted in FIG. 2 also enables DMA transfer in the opposite direction, from the local memory 220(4) to the system memory 214. Such a reverse transfer is used, e.g., when a job the DSP 220 processes results in a data to be further used by another entity than the processing DSP 220, to make space available in the local memory 220(4) while the data is temporarily not required by the DSP 220, or other reasons known to a person of ordinary skill in the art. The reverse transfer is initiated by the job manager 216 either as a set of commands for the job the DSP 220 is carrying, or as a set of commands of a different job. Consequently, the job command processing is similar to processing of any other job submitted to the DSP 220 as disclosed supra, except that the DMA data transfer is reversed. That is, upon receiving the job related information from the job manager 216 in the register structure 218_2(10) via the job first in, first out (FIFO) buffer 218_2(8), the DSP core 220(2) uses the job related information in the register structure 218_2(10) to program the internal programmable DMA engine 218_2(6) to transfer the data from the local memory 220(4) into the data FIFO 218_2(4).

As the data is written into the data FIFO buffer 218_2(4), the data FIFO buffer 218_2(4) signals to the internal programmable DMA engine 218_6(2) whether the data FIFO buffer 218_2(4) is full or has space available. If the data FIFO buffer 218_2(4) is able to accept more data, the internal programmable DMA engine 218_6(2) issues a load requests to the local memory 220(4) in accordance with the DMA command; otherwise, the internal DMA engine 218_2 (2) pauses load requests until the data FIFO buffer 218_2(4) is able to accept more data.

The external programmable engine 218_2(6) reads the data from the data FIFO 218_2(4) and writes the data into the system memory 214 according to the DMA commands specified for the job. The process continues, until all the DMA commands from the list have been exhausted. The job manager 216 reports the information of job completion into the register 218_X(10).

As disclosed supra, the external programmable DMA engine 218_2(6) detects underflow and overflow conditions in accordance with the "last" bit in the limit register 218_X (10)(4) set by the DSP core 220(2). In case of an overflow error, the external programmable DMA engine 218_2(6) discards any data over the reported DMA transfer size, and in case of an underflow error the external programmable DMA engine 218_2(6) discards any remaining DMA commands without completing them.

As alluded to supra, a DSP 220 may be communicatively coupled to a plurality of programmable DMA units 218_X. Such an arrangement may allow e.g., for simplification of an architecture of the programmable DMA units 218_X, by e.g., designing a first subset of the plurality of programmable DMA units 218_X for a forward transfer and a second subset for a reverse transfer. Not only such design simplifies the architecture, but data and information may be transferred in parallel. By means of another example, the architecture of the programmable DMA units 218_X may be optimized for a specific transfer, e.g., an architecture for a data transfer requiring low latency may optimize the size of the FIFOs 218_2(4), 218_2(8). The given examples are meant for illustration and not limiting purposes because a person of ordinary skill in the art would be able to extend the architecture design in accordance with the disclosure.

Figure 3:
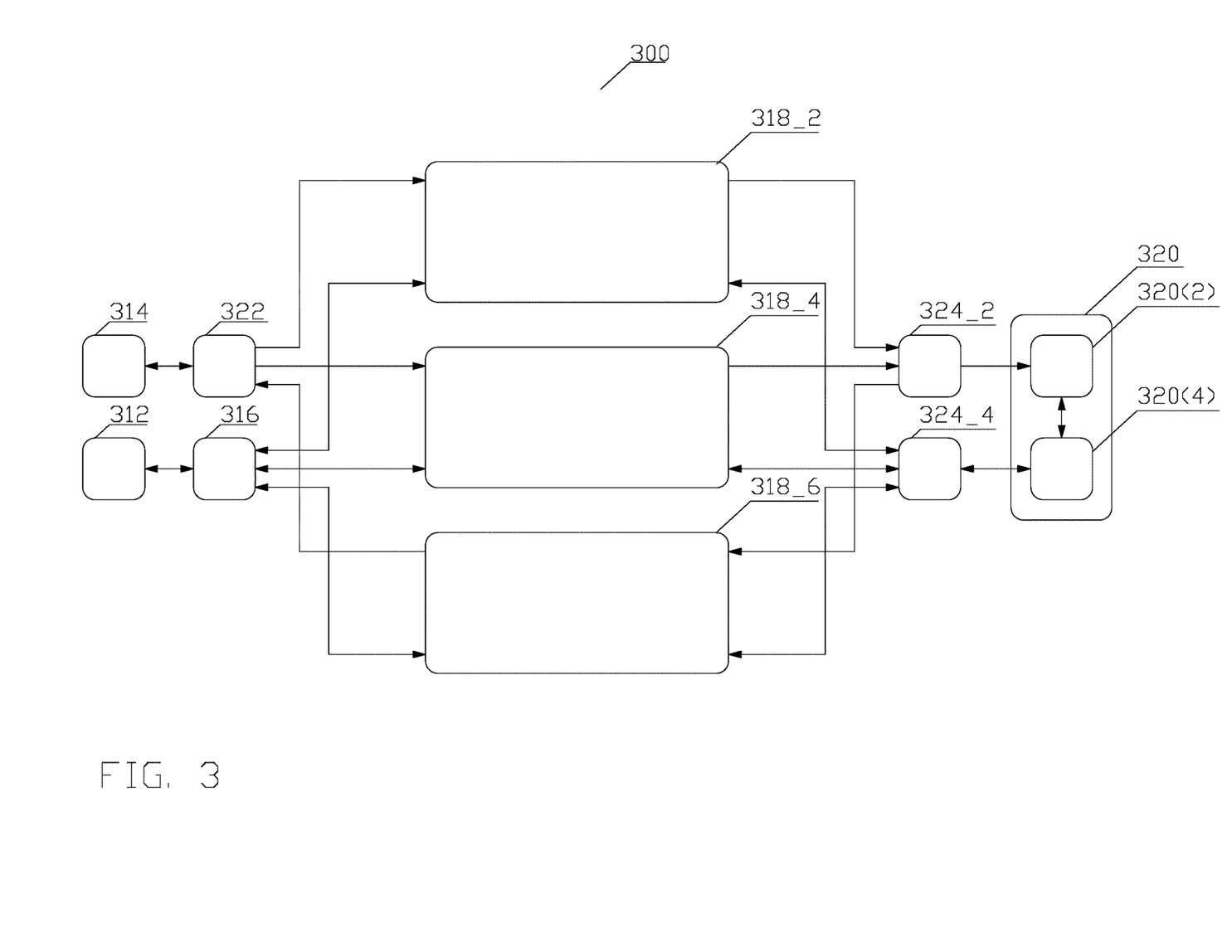
FIG. 3 depicts a conceptual structure 300 of multi programmable DMA units for efficient and flexible direct memory access in accordance with aspects of this disclosure.

Referring to FIG. 3, which shows an example of a plurality of three programmable DMA units 318_X, the job scheduler 312 selects a job from a plurality of jobs to be accomplished and provides the job description to a job manager 316. The job description comprises separate commands for each of the plurality of programmable DMA units 318_X, and the job manager 316 provides each of commands to the corresponding DMA engine 318_X. The job manager 316 can support multiple outstanding jobs, wherein the commands from each job are programmed into the each of the plurality of programmable DMA units 318_X in order.

The internal architecture (not shown in detail) of the programmable DMA units 318_X is substantially identical to the architecture of the programmable DMA units 218_X, except that the architecture of the programmable DMA unit 318_2 is limited to perform a DMA data transfer only in the forward direction, i.e., from the system memory 314 to the local memory 320(2), supports only a single DMA command per job, and the size of data transfer for this single command is either pre-programmed with some maximum size, or the size of the data transfer communicated through the job FIFO (not shown) to the limit register 218_X(10)(4), or a new register in 218_X(10) (not shown), thus the DSP 320 always know the exact size of the data transfer.

The architecture of the programmable DMA unit 318_4 is limited to perform a DMA data transfer only in the forward direction and supports an arbitrary number of DMA commands per job.

Finally, the architecture of the programmable DMA unit 318_6 being limited to perform the DMA data transfer only in the reverse direction, i.e., from the local memory 320(2) to the system memory 314.

By means of an example, consider that the job manager 316 receives a first job and a subsequent job. The job manager 316 may first program the programmable DMA unit 318_4 and the programmable DMA unit 318_6 with the commands from the first job. The DSP core 320(4) may program the programmable DMA unit 318_4 to first complete all DMA transfers for the first job, and then DSP core 320(4) may start programming the programmable DMA unit 318_4 DMA transfer(s) for the second job, before the programmable DMA unit 318_6 has completed any transfers for the first job. The DSP core 220(4) may then perform some calculation on the input data for the first job while the programmable DMA unit 318_4 transfers the input data for the second job. After the calculation completes, the DSP core programs the programmable DMA unit 318_6 to transfer the output data for the first job, while the DSP core 220(4) starts a calculation on the input data for the second job.

By means of another example, consider the above-disclosed aspect in reference to FIG. 2, when the DSP core 220(2) may program the internal programmable DMA engine 218_2(6) before notification of the upcoming job has been received and, therefore, before an DMA transfer for the upcoming job starts. As disclosed, in one aspect, the job description may be configured to always use the same size of DMA transfer, so that the value of the limit register 218_X(10)(4) can always be programmed in advance. In another aspect, the DSP 220 always programs a fixed size value into the limit register 218_X(10)(4) and clears the "last" bit in the limit register 218_X(10)(4), indicating that this is the first of multiple DMA transfers.

Referring now back to FIG. 3, since the programmable DMA unit 318_2 is limited to perform a DMA data transfer only in the forward direction, supports only a single DMA command per job, and the size of data transfer for this single command may be pre-programmed with some maximum size, the programmable DMA unit 318_2 may be used for the at least initial DMA data transfer. The data may comprise a job related information, notifying the DSP 320 how to program the programmable DMA unit 318_4 and optionally the programmable DMA unit 318_6 for further transfers or jobs. The ability to use the programmable DMA unit 318_2 to transfer data comprise a job related information allows greater flexibility of the job related information, especially when the job manager 316 is implemented in hardware, an can thus recognize only a limited formats of job descriptions.

Thus, the plurality of programmable DMA units 318_X may be optimized for a specific DMA transfer.

Although FIG. 3 depicts three programmable DMA units 318_X in a particular forward and reverse transfer design, such an arrangement is merely for explanation, and any number of the programmable DMA units 318_X and any combination of forward and reverse transfer design is contemplated.

Figure 4:
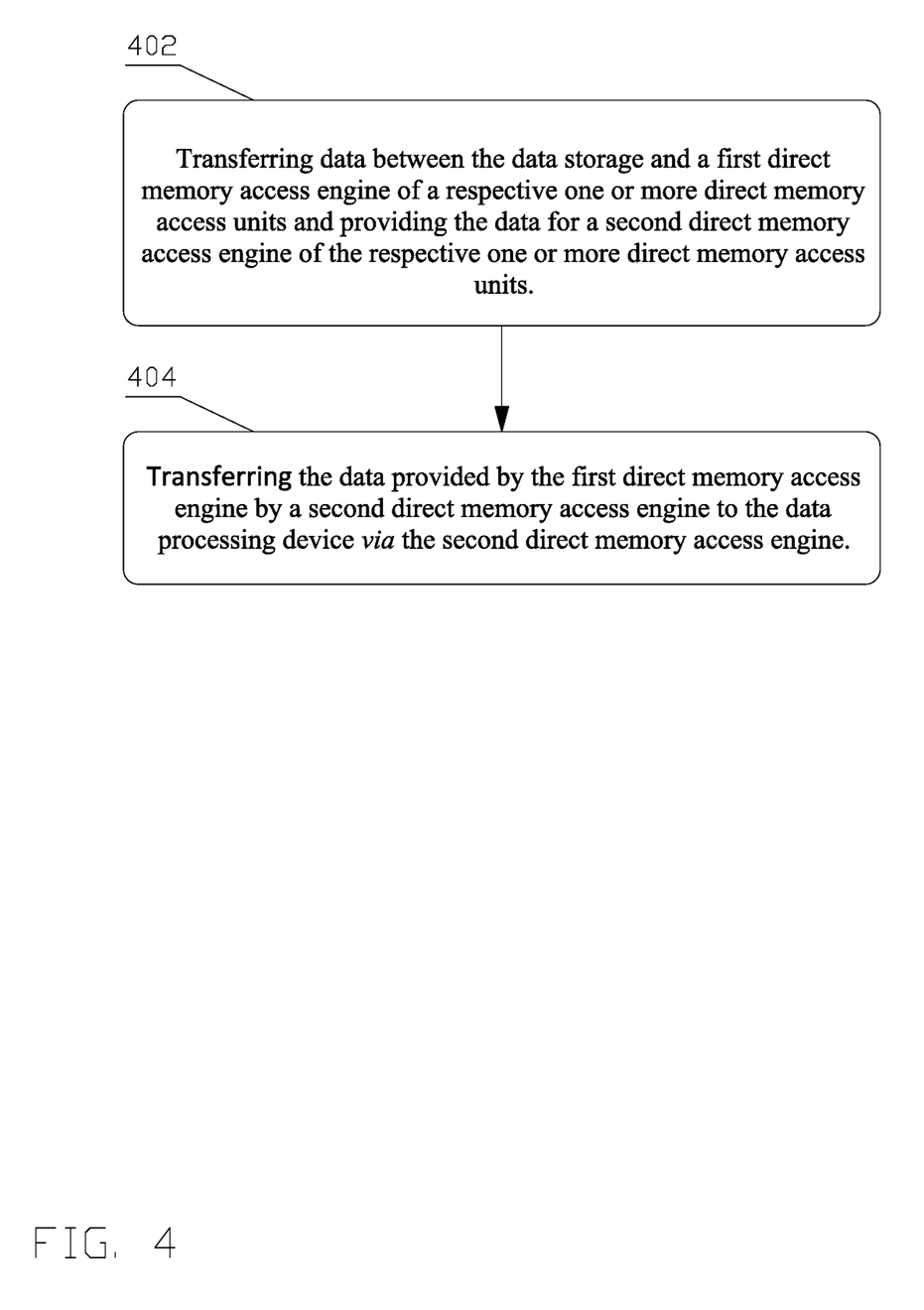
FIG. 4 depicts a flow chart 400 of a process for an efficient and flexible direct memory access.

FIG. 4 depicts a flow chart 400 of a process for an efficient and flexible direct memory access.

In block 402, one of a plurality of three programmable DMA units interposed between the data source and the data processing device transfers data between a first direct memory access engine of the one direct memory access unit and the data source and provides the data for a second direct memory access engine of the one direct memory access units.

The data transfer between the first direct memory access engine and the data source and providing the data for the second direct memory access engine is under control of the first direct memory access engine, which receives a job description controlling transferring and providing the data from a job manager. The process continues in step 404.

In block 404, the data provided by the first direct memory access engine is transferred by a second direct memory access engine to the data processing device.

The transfer of the data is controlled by programming the second direct memory access engine with at least information related to the job provided by the job manager, and instructions generated by the data processing device.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for a direct memory access between a data storage and a data processing device via one or more direct memory access units, comprising:
    providing a job description by a job manager to a first direct memory access engine;
    transferring data between the data storage and the first direct memory access engine and between the first direct memory access engine and a second direct memory access engine in accordance with the job description;
    providing information related to the job by the job manager;
    programming the second direct memory access engine by the data processing device in accordance with the provided information or by autonomously generated instructions; and
    transferring the data between the second direct memory access engine and the data processing device in accordance with the programming; wherein
    a direction of the transferring the data is determined in accordance with provided job description or with a configuration of each of the one or more direct memory access units.

2. The method as claimed in claim 1, further comprises:
    providing information related to the job by the job manager to the data processing device; and the programming the second direct memory access engine by the data processing device comprises programming the second direct memory access engine by the data processing device in accordance with the provided information related to the job.

3. The method as claimed in claim 1, wherein the programming the second direct memory access engine by the data processing device comprises:
    pre-programming the second direct memory access engine by the data processing device autonomously generated instructions.

4. The method as claimed in claim 2, wherein the programming the second direct memory access engine by the data processing device comprises:
    programming the second direct memory access engine by the data processing device generated instruction in accordance with the provided information related to the job and/or by the data processing device autonomously generated instructions; wherein
    the data processing device instructions comprise instructions to separate the direct memory access data transfer into one or more transfers of portions of the data.

5. The method as claimed in claim 1, further comprises:
    providing information related to the job comprising at least a preset-address and a size of the data by the job manager; and
    programming the second direct memory access engine comprises writing at least the preset-address and the size of the data into the second direct memory access engine without an involvement of the data processing device.

6. The method as claimed in claim 1, wherein the transferring data between the data storage and the first direct memory access engine and between the first direct memory access engine and the second direct memory access engine in accordance with the job description comprises:
    transferring the data between the data storage and the first direct memory access engine;
    transferring the data between the first direct memory access engine and a first-in, first-out buffer; and
    transferring the data between the first-in, first-out buffer and the second direct memory access engine.

7. The method as claimed in claim 1, wherein the transferring data between the data storage and the first direct memory access engine and between the first direct memory access engine and the second direct memory access engine in accordance with the job description; and transferring the data between the second direct memory access engine and the data processing device comprises:
transferring first data between the data storage and the first direct memory access engine and transferring the first data between the first direct memory access engine and a first-in, first-out buffer; and
transferring second data between the data storage and the first direct memory access engine and transferring the second data between the first direct memory access engine and the first-in, first-out buffer and simultaneously transferring the first data between the first first-in, first-out buffer and a second direct memory access engine and between the second direct access memory and the data processing device; wherein
transferring the first data according to a first job description and transferring the second data according to a second job description.

8. The method as claimed in claim 1, wherein the one or more direct memory access units comprises:
a plurality of direct memory access units; wherein
at least one of the plurality of the direct memory access units is configured for direct memory access data transfer from the data storage to the data processing device; and
at least one of the plurality of the direct memory access units is configured for direct memory access data transfer to the data storage from the data processing device.

9. An apparatus for a direct memory access, comprising:
a job manager:
a data storage;
a data processing device; and
one or more direct memory access units communicatively coupled with the job manager, the data storage, and the data processing device; wherein each of the one or more direct memory access units comprises:
a first direct memory access engine configured in accordance with a job description provided by the job manager to transfer data between the data storage and the first direct memory access engine and between the first direct memory access engine and a second direct memory access engine;
the data processing device configured to program the second direct memory access engine in accordance with information related to the job provided by the job manager or by autonomously generated instructions; and
the second direct memory access engine configured to transfer the data between the second direct memory access engine and the data processing device in accordance with the program;
wherein a direction of the transfer of the data is determined in accordance with the job description or with a configuration of each of the one or more direct memory access units.

10. The apparatus as claimed in claim 9, wherein the job manager is further configured to:
provide information related to the job to the data processing device; and
the data processing device is configured to program the second direct memory access engine in accordance with the provided information related to the job.

11. The apparatus as claimed in claim 9, wherein the data processing device is further configured to:
autonomously generate instructions; and
pre-program the second direct memory access engine with the autonomously generated instructions.

12. The apparatus as claimed in claim 9, wherein the data processing device is further configured to:
generate instructions to separate the direct memory access data transfer into multiple transfers of portions of the data in accordance with the provided information related to the job and/or the data processing device autonomously generated instructions; and
program the second direct memory access engine with the generated instructions.

13. The apparatus as claimed in claim 9, wherein the job manager is further configured to provide the information related to the job comprising at least a preset-address and a size of the data; and
the second direct memory access engine is programmed by writing in at least the preset-address and the size of the data without an involvement of the data processing device.

14. The apparatus as claimed in claim 9, wherein:
the first direct memory access engine is configured in accordance with a job description provided by the job manager to transfer the data between the data storage and the first direct memory access engine and between the first direct memory access engine and a first-in, first-out buffer; and to transfer the data between the first first-in, first-out buffer and the second direct memory access engine.

15. The apparatus as claimed in claim 9, wherein the first direct memory access engine configured in accordance with a job description provided by the job manager to transfers data between the data storage and the first direct memory access engine and between the first direct memory access engine and the second direct memory access engine by being configured:
to transfer first data between the data storage and the first direct memory access engine and to transfer the first data between the first direct memory access engine and a first-in, first-out buffer; and
to transfer second data between the data storage and the first direct memory access engine and to transfer the second data between the first direct memory access engine and the first-in, first-out buffer; and
the second direct memory access engine being configured to transfer the first data from the first-in, first-out buffer to the data processing device simultaneously with the first direct memory access engine transferring the first data to the first-in, first-out buffer; wherein
the first data is transferred according to a first job description and the second data is transferred according to a second job description.

16. The apparatus as claimed in claim 9, wherein the one or more direct memory access units comprises:
a plurality of the direct memory access units; wherein
at least one of the plurality of the direct memory access units is configured for direct memory access data transfer from the data storage to the data processing device; and
at least one of the plurality of the direct memory access units is configured for direct memory access data transfer to the data storage from the data processing device.

* * * * *